United States Patent [19]

Ebeling et al.

[11] 3,775,560

[45] Nov. 27, 1973

[54] INFRARED LIGHT BEAM X-Y POSITION ENCODER FOR DISPLAY DEVICES

[75] Inventors: Frederick A. Ebeling, Dearborn, Mich.; Roger L. Johnson, Monticello; Richard S. Goldhor, Champaign, both of Ill.

[73] Assignee: University of Illinois Foundation, Urbana, Ill.

[22] Filed: Feb. 28, 1972

[21] Appl. No.: 229,870

[52] U.S. Cl. ............. 178/18, 250/83.3 HP, 178/6.8

[51] Int. Cl. ............. G08c 21/00

[58] Field of Search ............. 178/6.8, 17, 18, 178/19, 20; 340/173 LT, 173 PL, 173 CR; 250/83.3 HP, 83 UV; 35/9 R

[56] References Cited

UNITED STATES PATENTS

| | | | |
|---|---|---|---|
| 3,328,523 | 6/1967 | Treseder | 178/6.8 |
| 3,614,439 | 10/1971 | Beelik, Jr. | 250/83.3 HP |
| 3,654,389 | 4/1972 | Pole | 178/18 |
| 3,493,754 | 3/1970 | Black | 250/83.3 HP |

OTHER PUBLICATIONS

494, Vol. 9, No. 5, Oct. 1966, IBM Technical Disclosure Bulletin, "Light Beam Matrix Input Terminal," P. Betts.

*Primary Examiner*—Kathleen H. Claffy
*Assistant Examiner*—Kenneth Richardson
*Attorney*—Charles J. Merriam et al.

[57] ABSTRACT

A crossed light beam position encoder including *x* and *y* coordinate arrays of paired infrared light sources and detectors for covering a display device surface with *x* and *y* crossed light beams, scanning means coupled to the sources and detectors for electronically sequentially scanning the *x* and *y* arrays so that only one source is emitting light and its associated detector is detecting light at any particular time. Means are included for noting the digital address of the beams during sequential scanning and for stopping the scan when the beams are interrupted, the digital address and therefor the position of the broken beams are transferred back to a computer.

13 Claims, 3 Drawing Figures

INFRARED LIGHT BEAM X-Y POSITION ENCODER FOR DISPLAY DEVICES

This invention relates to position encoder apparatus and in particular to infrared light beam position encoders for display devices.

Input devices used in conjunction with a computer control display for interactive information exchange between man and computer, via display, generally function as position encoders, that is, light pens, Rand Tablets, etc. Numerous devices and techniques that can be used to accomplish this task have been reported in the literature, such as the following:

1. A.M. Hlady, "A Touch Sensitive X-Y Position Encoder for Computer Input," AFIPS FJCC Proc. Vol. 35, 545, 1969.
2. R.J. Fitzhugh and D. Katsuki, "The Touch Sensitive Screen as a Flexible Response Device in CAI and Behavioral Research," Behavioral Research Meth. and Instru., Vol. 3 (3), page 159, 1971.
3. R.K. Marson, "Conducting Glass Touch-Entry System", Society of Information Display Digest of Technical Papers, May 1971.
4. M.R. Davis and T.O. Ellis, "The RAND Tablet: A Man-Machine Communication Device," AFIPS FJCC Proc. Vol. 26, p. 325, 1964.
5. "Crossed Light Beams Bridge Operator/Display Interface," Electronics, Oct. 11, 1971.

Although many of the devices such as illustrated in the aforementioned literature can be used with various display devices, such as plasma display panels, cathode ray tubes, etc., they are generally very expensive and would not be used where low cost is an overall system requirement.

As an example of the low cost requirement, reference may be made to U.S. Pat. No. 3,405,457 wherein there is disclosed a computer controlled teaching system which includes a display device at each student station. The system therein illustrated is capable of servicing at least 32 student stations although this is by no means a limitation since current designs for such a system specify 4,000 stations, each of which would include a display device. Because of the large number of display devices in such a system, and the application of such a system to the educational field, it becomes extremely important to meet low cost system requirements, particularly where it is desired to add to the system an x-y position encoder for each display device.

Several primary objectives can be defined:

1. The device must encode absolute positions indicated by the user.
2. The input surface must be superimposed upon the display surface and provide for a minimum of parallax.
3. Positions are to be indicated with a passive stylus, in particular, the human finger.

Although crossed light beam systems have been discussed in earlier literature (see literature list, item 2 above), such systems are extremely expensive, the excessive costs being due to the complex nature of the photosensing portion thereof. The complex nature of such systems is mandatory to assure that light from a particular source arrives only at its associated detector and does not impinge upon other nearby active detectors. Thus, in such prior crossed light beam systems it is necessary to construct rather elaborate optical collimation schemes, generally involving lenses to produce the required beam collimation.

SUMMARY OF THE INVENTION

A crossed light beam position encoder in accordance with the present invention includes *x-y* coordinate arrays or sets of paired light sources and detectors for covering the display device surface with *x* and *y* crossed light beams. Prior requirements for beam collimation at all of the sources and detectors has been eliminated in the present invention by activating only one source/detector pair at a time, that is, the *x* and *y* array of source/detector pairs is electronically scanned so that only one source is emitting light and its associated detector is detecting light at any particular time. The digital address of the beams are noted during sequential scanning.

If a broken beam is detected during this scanning operation, the scan is stopped at that point and the digital address (or position) of the broken light beam is transferred back to the computer. After this operation is completed, the scanning operation is resumed. This operation is of course completed for both the *x* and *y* arrays. Using this technique, the problems of optical cross talk are completely and simply eliminated without the aid of complex collimation schemes. There is thus provided a low cost position encoder which can be used in conjunction with computer controlled displays to function as a position encoder.

DETAILED DESCRIPTION

Figure 1:
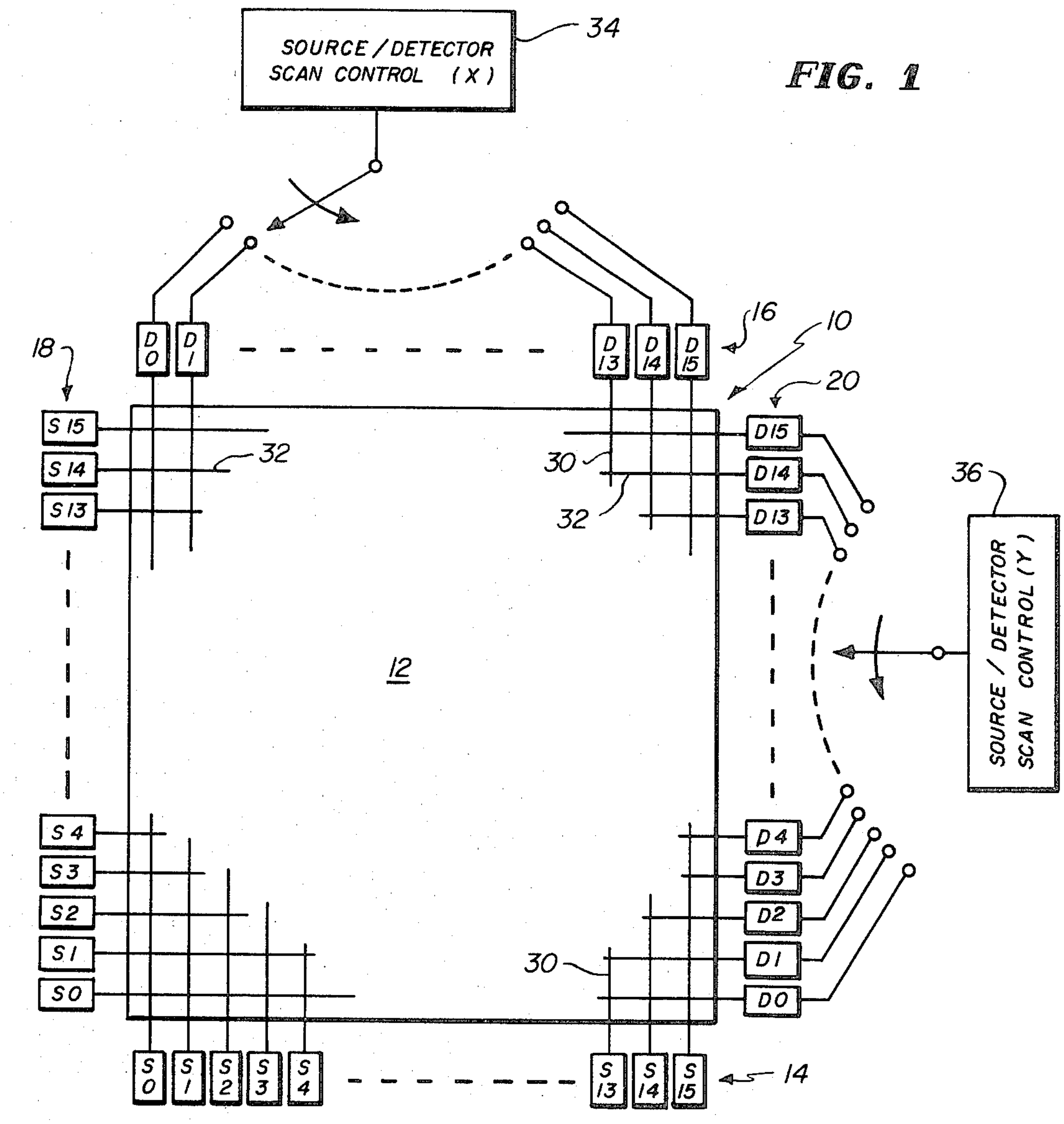
FIG. 1 is a schematic illustration of the *x-y* position encoder in accordance with the present invention.

Referring now to FIG. 1, there is illustrated a display device 10 having a display surface 12. An *x* array of 16 infrared sources 14 are mounted along one side of the display device and are paired with a corresponding *x* array of infrared light detectors 16 suitably mounted on the opposite side of the display device 12.

A similar *y* array of paired infrared sources 18 and detectors 20 are mounted along the remaining two opposite sides of the display device as illustrated in FIG. 1. Thus, 32 pairs (16 per *x* and *y* axis) are mounted around the perimeter of display panel 10.

Figure 2:
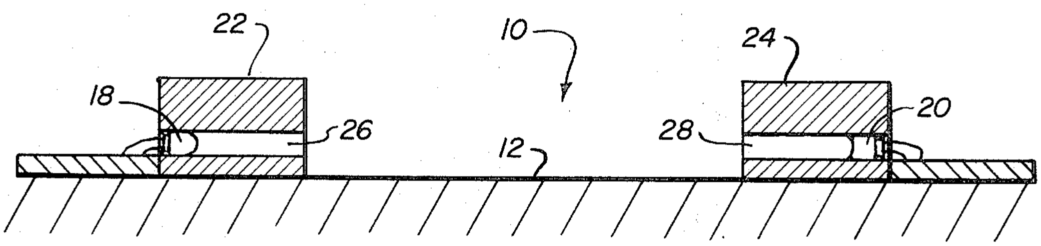
FIG. 2 is a cross-sectional view of the mounting arrangement for the 16 element *x-y* source/detector arrays for providing a crossed light beam adjacent the display device surface.

Reference may be made to FIG. 2 wherein there is illustrated the display panel 10 and the mounting blocks 22 and 24 containing the infrared sources and detectors. For ease of illustration, only a partial sectional view is illustrated since the mounting for the sources and detectors along the *x* and *y* axis is substantially similar. Thus, mounting block 22 mounted on or adjacent the surface 12 contains a series of passageways 26 at one end of which there is mounted, for instance, an infrared light source 18. Similarly, mounting block 24 on the opposite side of the display panel contains a series of passageways 28 each having an infrared light detector 20 mounted at one end of the passageway in mounting block 24 in order to provide for maximum noise protection from possible ambient sources of infrared emission near the display panel. addresses Since the use of light sources which emit in the visible part of the spectrum is undesirable from both a human viewer standpoint and because of ambient light noise problems, gallium arsenide LED's (light emitting diodes, emitting at 900 nm) and infrared phototransistors are used as the source/detector pairs.

As shown in FIG. 1, the paired arrays of 16 infrared sources and detectors on respective sides of the display panel are arranged so as to provide crossed light beams such as the *x* light beam 30 from source $S_2$ to detector $D_2$, and the *y* light beam 32 from source $S_{14}$ to detector $D_{14}$. The *x* source/detector scan control 34 electronically scans the *x* sources and detectors in order to activate only one source/detector pair at a time so that only one beam along the *x* direction (such as beam 30) is present at any particular time. Similarly, a *y* source/detector scan control apparatus 36 is provided to electronically scan the *y* sources and the detectors to selectively activate only one source/detector pair at a time and provide only one beam along the *y* direction (such as beam 32) at any particular time. Thus the *x* and *y* arrays of source/detector pairs are sequentially scanned to provide corresponding crossing beams.

Figure 3:
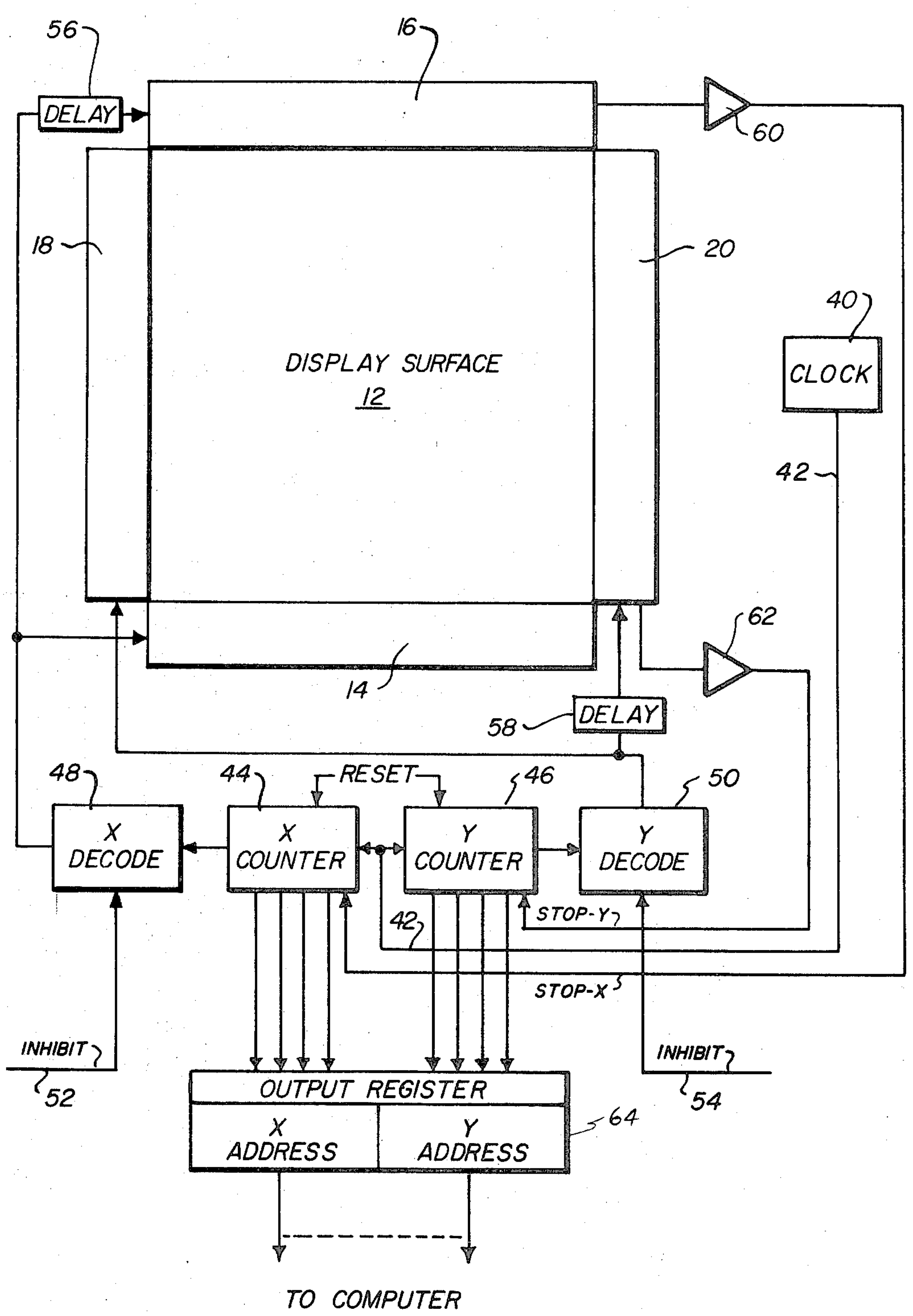
FIG. 3 illustrates a 16 × 16 element *x-y* position encoder system with the necessary electronic scanner apparatus in accordance with the principles of the present invention.

Referring now to FIG. 3, there is illustrated an *x-y* position encoder for supplying the position in the form of a digital signal for computer input. The *x* and *y* arrays of paired infrared sources and detectors are arranged in connection with the display surface 12 as illustrated in FIG. 1. As previously described, this system of sources and detectors can be used to detect the presence and position of a passive stylus, that is, the finger, when it is placed into the plane of the array. The passive stylus will block a sufficient amount of light from the infrared source so that the signal output of the associated light detector (the detector directly opposite this source) will be decreased by an electronically detectable amount. When a blocked light beam is electronically detected, this beam position in the array is converted into a digital signal which identifies the position of the beam to the digital system being used with this encoder. The array in FIGS. 1 and 3 provides a grid of 256 addressed positions which can be detected.

The infrared light beams are sequentially scanned across the display surface 12 with an "effective" beam diameter of approximately 1/16 inch. This configuration was selected on the basis of the typical finger diameter, that is approximately 7/16 inch. Although it is obvious that the technique can be extended to higher resolution grids, the particular application described here did not require a resolution greater than two positions per inch.

A constructed embodiment of the present invention was utilized in connection with a plasma display and memory device similar to that shown in the D.L. Bitzer et al. U.S. Pat No. 3,559,190 for incorporation as a display device at each terminal in the teaching system of the aforementioned D.L. Bitzer U.S. Pat. No. 3,405,457. On this plasma display, it is desired that the 8 ½ inches × 8 ½ inches square display surface be divided into 256 areas (a 16 × 16 matrix) which are sensitive to the selection and/or touch of the human finger. That is, the position or address of the area which is selected by pointing or touching of the human finger is automatically sent back to the central computer system in a manner similar to that used to send back key set information. The present infrared position encoder combines very effectively with the plasma display panel because the display surface can also function as a rear projection screen for projecting additional information onto the display surface.

While the present embodiment of the present invention is herein described in respect to its application to a plasma display and memory unit, it is to be understood that the application thereof is not so limited and can as well be applied to other types of display devices, such as cathode ray tubes, solid state displays, etc.

The need for optical collimation is eliminated in the present system by activating only one source/detector pair at a time in the *x* and *y* arrays. Since the LED's and phototransistors exhibit rise and fall times of 2–5 microseconds, large numbers of source/detector pairs can be scanned within time intervals which correspond to human finger reaction times. For example, if each source/detector pair is turned on for a 100 microseconds, than a source/detector array of 100 pairs could be scanned in 10 milliseconds.

Sensing the presence and absence of the source produced light beams is achieved with a phototransistor that is matched to the LED emission. The signal produced by currently available type of phototransistors, however, is much too small (approximately 100 millivolts) to be detected with a standard logic unit and as a result must be amplified. Since a detector has need for an amplifier only once per scan and since no two detector signals need to be amplified at the same time, only one multiplexed amplifier is needed per *x* and *y* array.

The circuit blocks used to perform the scanning, sensing and control functions of a 16 element *x* and *y* array are shown schematically in FIG. 3. The logic units used were of standard TTL type.

In general, the scanning, sensing and control functions are accomplished by electronically scanning the *x* and *y* arrays sequentially while keeping a record of the particular *x* and *y* address of the selectively activated source/detector pair in each array. The display surfaces are scanned from top to bottom and from left to right as shown in FIG. 3. Upon interruption of the light beams, the particular *x* and *y* address of the source/detector pairs in the *x* and *y* arrays are noted and transferred to the computer. The apparatus providing such functions and operations are shown in FIG. 3. In particular a free running clock 40 operates through line 42 to operate the *x* counter 44 and *y* counter 46 so as to sequentially select the address designations for each of the 16 source/detector pairs in the *x* and *y* arrays. Each of the *x* an *y* counters 44, 46 contains a four bit counter for specifying the digital address of each of the 16 associated paired sources and detectors.

Respective *x* and *y* decoders 48, 50 contains suitable logic gating circuits for decoding the respective four bit addresses from the *x* and *y* counters into one of the associated 16 lines. Each of the decoders 48, 50 is normally inhibited through respective inhibit lines 52, 54 for a preset delay time following the sequencing of a new address in the counters. This delay time eliminates the possibility of errors arising from noise erroneously gating the infrared sources and detectors through the decoders. As shown in FIG. 3, the output of the decoders is coupled into the respective *x* and *y* arrays of paired sources/detectors. Thus, during the time the *x* and *y* decoders are inhibited on lines 52 and 54, the IR sources and the detectors are inactivated. Following a new clock pulse to reset the counters 44, 46 to the next *x* and *y* address, and following a short delay to eliminate the aforementioned noise gating possibility, the respective four bit digital addresses in the counters are transformed by the decode circuits to operate the corresponding *x* and *y* infrared sources.

To insure that the respective corresponding detectors are receiving only the infrared light beam from the paired source, activation of the respective *x* and *y* detectors is delayed for a short time by delay circuits 56, 58. This delay time corresponds to the normal activation time for the infrared sources and detectors so as to insure that they are fully turned on, and normally amounts to approximately 100 microseconds. An *x* signal detector amplifier 60 and a *y* signal detector amplifier 62 are connected to the respective plurality of *x* and *y* infrared phototransistor detectors 16 and 20. The outputs of signal amplifiers 60 and 62 are coupled to the respective *x* and *y* counters to provide suitable signals to stop the counters in the event the respective light beams have been interrupted. If a light beam is interrupted, the *x* and *y* counters are stopped at the respective, corresponding four bit digital addresses and these addresses are then read out into output register 64 which is coupled to the computer to present the addresses in digital form to the computer input.

Thus, during operation of the system shown in FIG. 3, in the event there is no interruption of the crossed light beam on the display surface 12, the free running clock 40 keeps resetting counters 44, 46 to the respective four bit addresses of the associated 16 sources/detectors in the *x* and *y* arrays. The respective sources and detectors are therefore sequentially selected from top to bottom and from left to right, and sequentially activated through the associated decoders 48, 50. In the event there is an interruption of a light beam, such as of beam 32 (see FIG. 1), the electrical output of the associated infrared detector would be coupled to *y* signal detector amplifier 62 and present a STOP-Y signal to *y* counter 46. This locks the *y* counter at the associated *y* address of beam 32. Assuming that the *x* beam had not yet been interrupted, the *x* array would still be sequentially scanned until for instance beam 30 was interrupted thereby presenting a STOP-X signal to *x* counter 44 to lock this counter at the particular *x* address. The *x* and *y* digital addresses would be loaded into output register 64 and then transferred to the computer input.

The address information is used by the computer for various purposes which are beyond the scope of the present application. In general, some form of feed back indication from the computer would be coupled to the display. Audio feedback could also be provided if desired.

If the operator now lifts his finger from the display surface so that both beams 30 and 32 are no longer interrupted, the x and y counters are reset and the sequential scanning of the display surface continues again.

While the scanning and control apparatus has been illustrated herein in block diagram form, such apparatus is well known to those skilled in the art and can readily be constructed. In a constructed version of the present invention, the various logic units illustrated were of the standard TTL type. Various other forms of the logic units can be provided such as described in "Pulse and Digital Circuits" by J. Millman and H. Taub.

Thus, the basic advantages of the present invention over existing schemes are low cost and the absence of optical collimation apparatus and additional layers, grids or surfaces which must be placed in the optical path of the display. Furthermore, it is to be understood that although the present application has been described in connection with application to a plasma display and memory unit, the present *x-y* position encoder can, in addition, be used in numerous other display applications which require touch input capability.

The foregoing detailed description has been given for clearness of understanding only, and no unnecessary limitations should be understood therefrom, as modifications will be obvious to those skilled in the art.

What is claimed is:

1. An x-y coordinate position address encoder for display devices comprising:

an array of a plurality of infrared sources and detectors mounted in a paired manner along respective sides of said display device to provide respective crossing beams in the *x* and *y* coordinate directions adjacent the surface of said display device;

means, coupled to said plurality of infrared sources and detectors, for sequentially activating pairs of said sources and detectors for beam scanning the surface of said display device in the x direction while simultaneously sequentially activating pairs of said sources and detectors for beam scanning the surface of said display device in the y direction; and address means for responding to an interruption of said crossing beams and providing the x and y address of the position of said interruption.

2. An x-y position address encoder for display devices comprising:

a plurality of paired *x* infrared sources and detectors arranged to provide infrared beams along the *x* coordinate direction adjacent the surface of said display device;

a plurality of paired *y* infrared sources and detectors arranged to provide infrared beams along the *y* coordinate direction adjacent the surface of said display device;

sequential timing control means selectively coupled to said plurality of *x* and *y* infrared sources and detectors for sequentially operating coresponding pairs of *x* infrared sources and detectors, while sequentially operating corresponding pairs of *y* infrared sources and detectors;

said *x* and *y* sources when sequentially operated providing intersecting infrared beams sequentially scanning the surface of said display device;

said sequential timing control means including *x* and y address counters, including means for denoting the x and y address of the particular pairs of *x* and *y* infrared sources and detectors when sequentially operated; and stop address means coupled to said *x* and *y* address counters and including means responsive to an interruption of said intersecting infrared beams for stopping said counters at the corresponding *x* and *y* position addresses.

3. An *x-y* position address encoder for display devices as claimed in claim 2, wherein said *x* and *y* address counters further includes means for denoting the $x$ and $y$ digital address of the particular pairs of $x$ and $y$ infrared sources and detectors during sequential operation.

4. An $x$-$y$ position address encoder for display devices, as claimed in claim 3, including storage means for storing said $x$ and $y$ digital addresses corresponding to said interrupted infrared beams, said storage means including a register having respective portions thereof coupled to said $x$ and $y$ address counters for respectively storing said $x$ and $y$ digital addresses.

5. An $x$-$y$ position address encoder for display devices comprising:

an array of a plurality of paired infrared sources and detectors arranged to provide intersecting infrared beams along a first direction ($x$) and a second direction ($y$) adjacent and along the surface of said display device;

said infrared detectors providing a respective output signal upon interruption of the associated infrared beam;

$x$ and $y$ counters including means for specifying the respective digital addresses of each of said paired infrared sources and detectors associated with said $x$ and $y$ directions;

a clock coupled to said $x$ and $y$ counters for sequentially setting said counters to said digital addresses;

$x$ and $y$ decoder means respectively intercoupling said $x$ and $y$ counters with said associated paired infrared sources and detectors;

said $x$ and $y$ decoder means including means for sequentially selectively operating said paired infrared sources and detectors in response to said digital addresses so as to sequentially scan the surface of said display device with corresponding infrared beams in the $x$ and $y$ directions;

$x$ and $y$ signal amplifying means respectively coupled to said plurality of infrared detectors for amplifying said respective output signal presented thereto upon interruption of the associated infrared beam during sequential scanning; and means coupled to said $x$ and $y$ counters and to said $x$ and $y$ signal amplifying means for stopping said counters in response to said respective output signal at the digital address of the associated interrupted associated infrared beams.

6. An $x$-$y$ position address encoder for display devices according to claim 5, including an output register coupled to said $x$ and $y$ counters for storing the digital addresses associated with said interrupted beams.

7. An $x$-$y$ position address encoder for display devices as claimed in claim 5, including means for displaying operation of said selected infrared source corresponding to said digital address so as to prevent undesired erroneous operation of said selected infrared source.

8. An $x$-$y$ position address encoder for display devices as claimed in claim 5, including means for correlating the operation of said selected infrared sources in response to said digital addresses sequentially specified in said $x$ and $y$ counters with the operation of said selected infrared detectors.

9. An $x$-$y$ position address encoder for display devices as claimed in claim 5, including means for resetting said $x$ and $y$ address counters in response to the detection of previously interrupted beams.

10. An $x$-$y$ coordinate position address encoder for display devices comprising:

an array of a plurality of non-visible radiation sources and detector devices mounted in a paired manner along respective sides of said display device to provide respective crossing beams in the $x$ and $y$ coordinated directions adjacent the surface of said display device;

counter means, including means coupled to said plurality of paired non-visible radiation sources and detector devices, for sequentially activating pairs of said sources and detector devices to scan the surface of said display device with said respective beams in the $x$ direction while simultaneously sequentially activating pairs of said sources and detector devices to scan the surface of said display device with said respective beams in the $y$ direction; and address means for responding to an interruption of said crossing beams and providing the $x$ and $y$ address of the position of said interruption.

11. An $x$-$y$ coordinate position address encoder for display devices as claimed in claim 10, wherein said non-visible radiation sources comprise a plurality of infrared light emitting diodes, and wherein said detector devices each includes an infrared phototransistor.

12. An $x$-$y$ position address encoder for display devices comprising:

a plurality of paired $x$ non-visible light sources and detectors arranged to provide non-visible light beams along the $x$ coordinate direction adjacent the surface of said display device;

a plurality of paired $y$ non-visible light sources and detectors arranged to provide non-visible light beams along the $y$ coordinate direction adjacent the surface of said display device;

sequential timing control means selectively coupled to said plurality of $x$ and $y$ non-visible light sources and detectors for sequentially activating corresponding pairs of $x$ sources and detectors, while sequentially activating corresponding pairs of $y$ sources and detectors;

said $x$ and $y$ sources when sequentially activated providing intersecting non-visible light beams sequentially scanning the surface of said display device;

said sequential timing control means including $x$ and $y$ address counters, including means for denoting the $x$ and $y$ address of the particular pairs of $x$ and $y$ sources and detectors when sequentially activated; and means coupled to said $x$ and $y$ address counters and including means responsive to an interruption of said intersecting non-visible light beams for identifying the corresponding $x$ and $y$ position addresses.

13. An $x$-$y$ position address encoder for display devices as claimed in claim 12, wherein said non-visible light sources each comprises an infrared light emitting semiconductor device.

* * * * *